United States Patent [19]

Varga

[11] E Re. 28,685

[45] Reissued Jan. 20, 1976

[54] METHOD AND APPARATUS FOR THE TREATMENT OF COTTON FIBRES

[75] Inventor: André Varga, Toronto, Canada

[73] Assignee: Carding Specialists (Canada) Limited, Toronto, Canada

[22] Filed: Nov. 14, 1969

[21] Appl. No.: 871,494

Related U.S. Patent Documents

Reissue of:

[64] Patent No.: 3,003,195
Issued: Oct. 10, 1961
Appl. No.: 771,050
Filed: Oct. 31, 1958

[52] U.S. Cl. ..... 57/156; 19/106; 19/200; 57/50

[51] Int. Cl.[2] ..... D02G 3/00; D01G 15/00

[58] Field of Search ..... 19/65, 98, 99, 106, 150, 19/200

[56] References Cited

UNITED STATES PATENTS

| | | | |
|---|---|---|---|
| 318,730 | 5/1885 | Harmel | 19/98 |
| 1,211,190 | 1/1917 | Leveugle | 19/98 |
| 2,246,454 | 6/1941 | Peloquin | 19/150 |
| 2,323,167 | 6/1943 | Varga | 19/66 |
| 2,326,331 | 8/1943 | Chantler | 19/150 |
| 2,910,734 | 11/1959 | Clark | 19/106 |

FOREIGN PATENTS OR APPLICATIONS

| | | | |
|---|---|---|---|
| 616,815 | 1/1949 | United Kingdom | 19/65 |

OTHER PUBLICATIONS

Text Book, "Cotton Carding" by Willis & Moore, Copyright 1936.

Humphrey: Carding Machine, Oct. 4, 1811.

"The Peralta Machine in Woollen Carding" by G. Marshall, pp. 520–523, The Textile Manufacturer, Nov. 1948.

*Primary Examiner*—Dorsey Newton
*Attorney, Agent, or Firm*—Elliott I. Pollock

[57] ABSTRACT

*A method and apparatus for the production of cotton yarns by the cotton system treats cotton fibers in a sequence of steps comprising carding the fibers and forming them into a thin carded web, passing the web through crushing rollers to crush small impurities in the web, subjecting the web on leaving the crushing rollers to a longitudinal drafting action sufficient to cause relative longitudinal fiber movement therein, condensing the web into a sliver, and drafting and spinning and fibers of said sliver into yarn.*

2 Claims, 3 Drawing Figures

Fig. 1
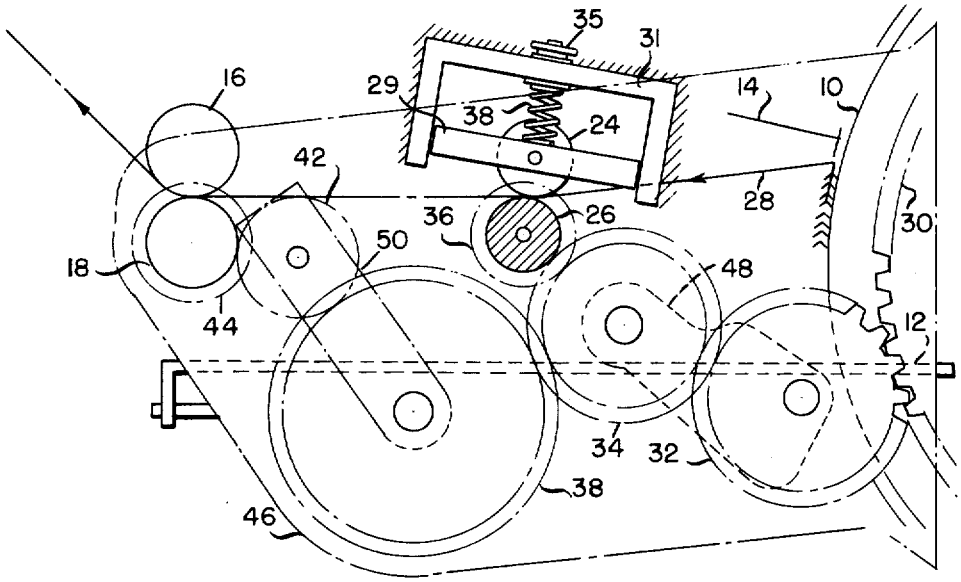
Fig. 3
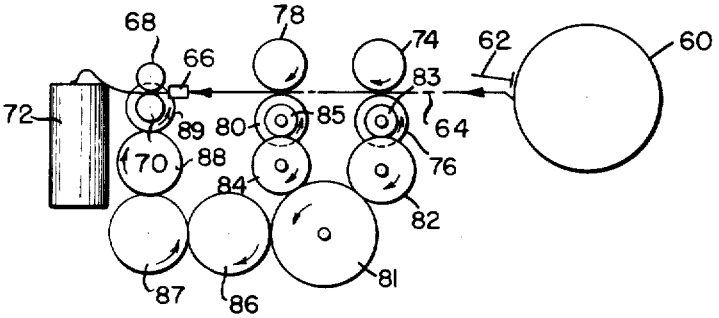
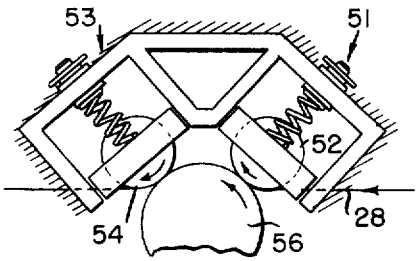
Fig. 2
INVENTOR
André Varga
BY Morris & Bateman
ATTORNEYS

METHOD AND APPARATUS FOR THE TREATMENT OF COTTON FIBRES

Matter enclosed in heavy brackets [ ] appears in the original patent but forms no part of this reissue specification; matter printed in italics indicates the additions made by reissue.

In the production of cotton yarns [, a] *by the cotton system cotton fibres are carded by means of a cotton carding machine, which may be either a single cylinder cotton card or equivalently a tandem cotton card. After carding is finished the fibres are stripped from the card in the form of a thin carded web, which is then condensed into a round fibrous mass called a sliver. Without further carding the* sliver of cotton fibres is *thereafter* drafted and spun [, and]. I have found that this process will be facilitated and the product improved if the surface of the cotton fibres is smoothed. If this is done, then the fibres will slide over one another more readily and fewer neps will be formed during drafting and spinning.

The present invention is designed to provide a method of and means for treating cotton fibres so as to facilitate drafting and spinning.

According to this invention, [a] *the* very thin *carded* web of cotton fibres is ironed to cause all or a substantial proportion of the individual fibres to be smoothed by passing it through ironing rollers and the web leaving the ironing rollers is subjected to a drafting action.

In addition to the smoothing of the fibres, the effect of the ironing process, if the pressure is adequate, is to crush small impurities such as particles of cotton seeds and leaves present in the web, and this assists in the subsequent removal of the impurities. The drafting action is necessary [for two purposes. One of these is that] *because* unless some tension is applied to the web leaving the nip of the ironing rollers, the web will tend to stick to these rollers. This sticking of the web to the rollers is itself due to two causes, one being the presence of resinous oil in some of the impurities which contaminate the roller surface, and the other being the static electricity generated in the cotton web by its processing prior to and during the ironing action.

[The other] *Another* purpose of the drafting of the ironed web is to [bring] *aid in bringing* about what might be called an unexpected effect, since it appears that the action of moving the fibres relative to one another, as occurs in drafting, sets the substance of crushed impurities free and allows these impurities to drop out during subsequent processing (e.g. drafting, spinning, weaving).

The ironing and drafting can most conveniently be effected on the web of cotton fibres as it leaves the doffer of a carding machine, and before it is condensed in width to form a sliver for transfer to a subsequent operation, e.g. spinning. Consequently, a pair of highly polished ironing rollers may be rotatably mounted on the carding machine frame to receive the carded web of fibres as the latter is removed from the doffer, usually by means of a fly comb. These ironing, or impurity crushing, rollers are driven at a speed sufficient to take up slack between the doffer and the ironing rollers. The rollers are therefore disposed between the doffer and the drawing-off or so called "calender" rollers so that the web, after passing through the nip between the ironing rollers, is reduced in width or condensed in the usual manner as it approaches the drawing off rollers which deliver the cotton fibres in the form of a sliver which is then collected in a can for transfer to a succeeding operation in the course of yarn manufacture. One or both of the ironing rollers will be driven, at the same or at a greater surface speed than that of the doffer roller so as to maintain the web in tension. The surface speed of the drawing off rollers will be greater than that of the ironing rollers to produce the drafting effect. The calender rollers are rotated at a sufficiently greater surface speed than the ironing rollers to cause relative longitudinal fiber movement in said web between the ironing rollers and the calender rollers.

The construction and arrangement of apparatus for carrying out the invention will now be described by way of example only with reference to the drawings in which:

FIG. 1 is a side view of part of a cotton carding machine modified in accordance with the invention;

FIG. 2 is a diagram showing an alternative arrangement of ironing rollers, and

FIG. 3 is a diagram showing a further alternative arrangement.

Referring to the arrangement shown in FIG. 1, 10 represents the doffer of a cotton carding machine, 12 is part of the machine frame, 14 is the fly comb used for stripping *the* carded web of material from the doffer, and 16 and 18 are the drawing-off or calender rollers which deliver the condensed sliver from the machine to a can coiler (not shown). All the parts so far mentioned form well known parts of cotton carding machines, and need not be described in detail. It will be understood that the carding machine has other conventional parts such as a feed lattice, cylinder flats and condenser trumpet which are not described because they form no part of the present invention.

A pair of smoothly ground ironing rollers 24 and 26 are mounted on the machine immediately beyond the fly comb 14, so that the thin carded web of fibres indicated at 28 passes from the fly comb 14 through the ironing rollers 24 and 26 to the drawing off rollers 16 and 18. The ironing rollers crush impurities such as seed and fiber fragments in the web. Ironing rollers [16] *24* and [18] *26* rotate at a surface speed which is sufficient to take *up* slack in the web between them and the doffer, and the calender rollers are rotated at a surface speed sufficiently higher than the ironing rollers to cause relative longitudinal fiber movement in the web between the ironing rollers and the calender rollers. The ironing rollers may be pressed together in any convenient manner, for example by means of a weighted lever, or by spring pressure, or hydraulic means or a combination of such means.

One manner of loading the ironing roller pass is shown in FIG. 1 wherein the upper roller [26] *24* has its shaft [27] journaled in a block 29 slidably guided for vertical movement in a stationary support 31 on the machine frame. A spring 33 is compressed between block 29 and support 31, and an adjustment at 35 is provided for varying the compression of spring 33 and therefore the load resulting in the crushing action on impurities in the web. This arrangement is essentially that of Varga U.S. Pat. No. 2,323,167.

The drive for the ironing rollers may be obtained from any convenient member of the carding machine, but it is preferred that the drive from the doffer roller should be used, so that the ironing rollers will be started and stopped simultaneously with the doffer.

For this purpose, in this particular arrangement a gear wheel 30 is mounted on the doffer shaft (not shown), and this gear 30 meshes with intermediate gear wheels 32 and 34, one of which is a disengaging wheel to stop, if required, the apparatus driven by the following wheel assembly.

The wheel 34 meshes with a suitable size change gear 36 mounted on the shaft of the bottom ironing roller 26 and also with a large gear wheel 38. The top ironing roller 24 is driven from the bottom ironing roller through coupler gears (not shown) on the opposite side of the machine.

The large gear wheel 38 meshes with an intermediate gear wheel 42 which in turn meshes with a change gear wheel 44 fixed on the shaft of the bottom drawing-off roller 18. The top drawing off roller 16 is driven by coupler gears (not shown) on the opposite side of the machine.

A metal guard 46 encloses all the gear wheels in the above described drive arrangement. The change speed wheels mentioned above are carried on adjustable brackets 48 and 50. The reason for the provision of change speed gearing is so that the most effective speeds for the ironing rollers and the drawing off rollers relatively to the doffer and each other may be obtained.

As there may be a tendency for some impurities and/or fibres to stick to one or the other of the ironing rollers, means may be provided for keeping them clear. For example, scraper blades may be pressed into engagement with the surface of each roller, either by springs or by weighted levers or both. Any other convenient means may be provided for this purpose.

The ironing rollers may be cylindrical, but it may be desirable to make them slightly barrel shaped to compensate for deflection when pressed tightly together and so ensure contact along the entire lengths of the rollers. Another way of ensuring even distribution of pressure is to arrange the rollers with their axes slightly inclined to one another or crossed, that is, by swinging one roller about an axis which is radial to both rollers and passes through the mid point of both roller axes, such an arrangement being described in the specification of Pat. No. 697,106 (Great Britain).

FIG. 2 shows an alternative arrangement in which instead of employing a pair of ironing rollers, two secondary rollers 52 and 54 are spaced apart around the periphery of a main ironing roller 56, so that the web 28 passes successively through the nips between the roller 52 and the roller 56, and the roller 54 and the roller 56. It will be understood that three or even more secondary rollers could be arranged around a main roller in this way. The arrangements for pressing the secondary rollers into contact with the main roller, scraping the ironing rollers and ensuring contact along their entire lengths will be similar to those described with reference to FIG. 1 of the drawings.

Loading units 51 and 53, which are essentially the same as used for [leading] *loading* the ironing rollers of FIG. 1, are provided to spring load rollers 52 and 54 toward the surface of main ironing roller 56.

FIG. 3 shows diagrammatically an arrangement in which advantage is taken of the facility of web drafting, by providing one or more additional pairs of ironing rollers so that the web will be treated successively by two or more pairs of ironing rollers, each pair of rollers being rotated at a greater surface speed than the preceding pair whereby drafting will take place between the successive pairs of rollers.

Rollers 74 and 76 are rotated at a speed sufficient to take up slack between them and the doffer 60. Rollers 78 and 80 are rotated at a surface speed sufficiently higher than that of rollers 74 and 76 to cause relative longitudinal fiber movement in the web therebetween, and draw-off or calender rollers 68, 70 are rotated at a surface speed sufficiently higher than that of rollers 78, 80 to cause relative longitudinal fiber movement in the web therebetween.

By way of example, as shown in FIG. 3, a power driven gear 81 may be connected by gears 82 and 83 to rotate ironing roller 76, and by gears 84 and 85 to rotate ironing roller 80. Gears 83 and 85 are the same size, but gear 84 is sufficiently smaller than gear 82 that the ironing roller 80 will be driven at the desired speed higher than ironing roller 76.

In FIG. 3, 60 is the doffer, 62 is the fly comb, 64 is the web of fibres, 66 is the condenser trumpet, 68 and 70 are the drawing off rollers and 72 is the sliver can. Between the doffer 60 and the trumpet 66, there is provided two pairs of ironing rollers 74 and 76, and 78 and 80 which are similar to the rollers 24 and 26 in FIG. 1. The driving arrangement is such that the rollers 78 and 80 rotate at a greater surface speed than the rollers 74 and 76, but at less surface speed than the drawing off rollers 68 and 70. Gear 81 is connected by gearings 86, 87, 88, 89 to rotate the calender rollers at the desired speed higher than ironing rollers 78, 80 as illustrated in FIG. 3. It will be understood that to enable drafting to take place the distance between the two pairs of ironing rollers must be greater than the length of the longest fibres being treated.

In any of the arrangements described, the rollers may be unheated or some or all of the rollers may be heated by an convenient means, for example, the rollers may be hollow for passing a heating fluid through them, or there may be provided an electrically heated element extending partly or wholly through each roller. Furthermore, the rollers of each pair, or of each set where more than two rollers are used together, may either be driven at equal surface speeds or at different surface speeds so as to effect polishing as well as pressing of the cotton fibres.

The rollers may be heated as in Varga U.S. Pat. No. 2,323,167, issued June 29, 1943.

In operation, the drawing off rollers 18 and 16, or 68 and 70 must always be rotated at a higher surface speed than the ironing rollers (or the last pair of ironing rollers) to give the drafting effect essential for carrying out the method of the invention.

In any of the arrangements described, the ironing rollers may be coated or plated with a porous layer of metal, preferably chromium, with a very large number of capillary size cavities, capable of absorbing and retaining oil, thus ensuring a constant lubrication of the roller surface. This lubrication will minimize the adhesion of foreign matter to the working surface of the rollers, and will render the working of the scraper blades more efficient.

I claim:

[1. A method of treating cotton fibres comprising the steps of forming the fibres into a thin carded web, passing said web through crushing rollers adapted to crush small impurities in the web and subjecting said web on leaving said crushing rollers to a longitudinal drafting action sufficient to cause relative longitudinal fiber movement in the web.]

[2. A cotton carding machine having a doffer, a pair of calender rollers, a pair of impurity crushing rollers between said doffer and said calender rollers adapted to receive a carded web in substantially full width from the doffer, drive means rotating said crushing rollers at a speed sufficient to take up slack in the web between the doffer and the crushing rollers, and drive means rotating said calender rollers at a sufficiently greater surface speed than said crushing rollers to cause relative longitudinal fiber movement in said web between said crushing and calender rollers.]

[3. A cotton carding machine having a doffer, a pair of calender rollers, a pair of smoothly ground ironing rollers between said doffer and said calender rollers adapted to receive a carded web in substantially full width from the doffer, load means pressing said ironing rollers together with sufficient force to crush small impurities in said web, drive means rotating said ironing rollers at a speed sufficient to take up slack in the web between the doffer and said ironing rollers, and drive means rotating said calender rollers at a sufficiently greater surface speed than said ironing rollers to cause relative longitudinal fiber movement in said web between said crushing and calender rollers.]

[4. A cotton carding machine having a doffer, a pair of calender rollers, a main ironing roller between said doffer and said calender rollers, a plurality of secondary ironing rollers spaced apart around and contacting the periphery of said main ironing roller, load means pressing said secondary ironing rollers toward said main ironing roller with sufficient force to crush small impurities in the web, said ironing rollers directly receiving a carded web in substantially full width from the doffer, drive means rotating said ironing rollers with sufficient speed to take up slack in the web between said doffer and said ironing rollers and drive means rotating said calender rollers at a sufficiently greater surface speed than said ironing rollers to cause relative longitudinal fiber movement in said web between said ironing and calender rollers.]

5. A cotton carding machine having a doffer, a pair of calender rollers, at least two pairs of web impurity crushing ironing rollers spaced along said web between said doffer and said calender rollers, the first pair of ironing rollers receiving a carded web directly from the doffer, drive means rotating each of said pairs of ironing rollers at successively increasing surface speeds with the pair of ironing rolls nearer said doffer being rotated at a speed sufficient to take up slack in the web between it and the doffer and the next pair of ironing rollers being rotated at a speed sufficient to cause relative fiber movement in the web between said pairs of ironing rollers, and drive means rotating said calender rollers at sufficiently greater surface speed than the last pair of ironing rollers to cause relative longitudinal fiber movement in the web between said last pair of ironing rollers and said calender rollers.

*6. In the production of cotton yarns of improved quality and cleanliness by the cotton system, the method of treating the cotton fibres which comprises, in sequence:*

*a. carding the fibres and forming them into a thin carded web;*

*b. passing said web through crushing rollers adapted to crush small impurities in the web;*

*c. subjecting said web on leaving said crushing rollers to a longitudinal drafting action sufficient to cause relative longitudinal fibre movement therein;*

*d. condensing said web into a sliver; and*

*e. processing the fibres of said sliver into yarn by steps comprising drafting and spinning.*

* * * * *